US012198487B2

(12) United States Patent
Tachibana et al.

(10) Patent No.: US 12,198,487 B2
(45) Date of Patent: Jan. 14, 2025

(54) MANAGEMENT DEVICE, MANAGEMENT METHOD, AND NON-TRANSITORY COMPUTER READABLE RECORDING MEDIUM RECORDING MANAGEMENT PROGRAM

(71) Applicant: TOYOTA JIDOSHA KABUSHIKI KAISHA, Toyota (JP)

(72) Inventors: Katsuharu Tachibana, Nagoya (JP); Nana Kikuire, Shizuoka-ken (JP); Hiroshi Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/319,652

(22) Filed: May 18, 2023

(65) Prior Publication Data
US 2023/0419756 A1  Dec. 28, 2023

(30) Foreign Application Priority Data

Jun. 22, 2022  (JP) .................................. 2022-100682

(51) Int. Cl.
*G07C 9/00*  (2020.01)
(52) U.S. Cl.
CPC ..... *G07C 9/00571* (2013.01); *G07C 9/00896* (2013.01)
(58) Field of Classification Search
CPC .......................... G07C 9/00571; G07C 9/00896
USPC ......................................................... 340/5.2
See application file for complete search history.

(56) References Cited

U.S. PATENT DOCUMENTS

| 10,206,101 B2* | 2/2019 | Katou ...................... H04W 4/40 |
| 10,589,719 B1* | 3/2020 | Sohn ..................... B60R 25/241 |
| 2010/0004849 A1* | 1/2010 | Jeong .................. G01C 21/3815 |
| | | 340/995.12 |
| 2014/0075467 A1* | 3/2014 | Chritudass ......... H04N 21/4586 |
| | | 725/110 |
| 2015/0149042 A1* | 5/2015 | Cooper ................. B60R 25/245 |
| | | 701/48 |
| 2019/0122469 A1* | 4/2019 | Fujiwara ............... H04W 12/04 |
| 2020/0143688 A1* | 5/2020 | Shah ......................... B60N 3/16 |
| 2020/0334033 A1* | 10/2020 | Lee ..................... G06F 11/1433 |
| 2021/0157902 A1* | 5/2021 | Sakurai ..................... G06F 8/65 |
| 2021/0165644 A1* | 6/2021 | Harata ...................... G06F 8/61 |
| 2021/0168602 A1* | 6/2021 | Kim ................... H04W 12/041 |
| 2021/0271743 A1* | 9/2021 | Jung .................. H04W 12/041 |
| 2021/0349710 A1* | 11/2021 | Kang ..................... G06F 8/658 |

(Continued)

FOREIGN PATENT DOCUMENTS

JP  2020-033707 A  3/2020

*Primary Examiner* — Kerri L McNally
*Assistant Examiner* — Thang D Tran
(74) *Attorney, Agent, or Firm* — Dickinson Wright, PLLC (57) ABSTRACT

A management device that includes: a memory; and a processor coupled to the memory, wherein: the memory is configured to store communication information corresponding to versions of a protocol of a digital key that implements a key operation of a vehicle from a terminal registered at the vehicle; and the processor is configured to, in response to receiving a communication request in accordance with a predetermined version of the communication information from the terminal, delete communication information corresponding to a version preceding the predetermined version from the memory.

4 Claims, 6 Drawing Sheets

(56) References Cited

U.S. PATENT DOCUMENTS

| | | | |
|---|---|---|---|
| 2021/0373882 A1* | 12/2021 | Kang | G06F 8/65 |
| 2022/0197630 A1* | 6/2022 | Kobayashi | G06F 8/65 |
| 2022/0231862 A1* | 7/2022 | Chen | H04W 12/0471 |
| 2022/0237690 A1* | 7/2022 | Nakayama | G06Q 30/0645 |
| 2022/0388477 A1* | 12/2022 | Lee | H01Q 1/3275 |
| 2022/0413833 A1* | 12/2022 | Kodama | G06F 13/00 |

* cited by examiner

MANAGEMENT DEVICE, MANAGEMENT METHOD, AND NON-TRANSITORY COMPUTER READABLE RECORDING MEDIUM RECORDING MANAGEMENT PROGRAM

CROSS-REFERENCE TO RELATED APPLICATION

This application is based on and claims priority under 35 USC 119 from Japanese Patent Application No. 2022-100682 filed on Jun. 22, 2022, the disclosure of which is incorporated by reference herein.

BACKGROUND

Technical Field

The present disclosure relates to a management device, a management method, and a non-transitory computer readable memory medium recording a management program.

Related Art

Cars are widely used as an element of mobility services, and various services such as car sharing are expected to become more numerous and commonplace. In accordance with this trend, smartphones are being used as keys for cars, and demands on wireless digital key systems that do not require the handover of a physical key are rising.

Technologies relating to wireless digital key systems include, for example, Japanese Patent Application Laid-Open (JP-A) No. 2020-033707. JP-A No. 2020-033707 discloses an electronic key system for a vehicle that is provided with a portable device and an on-board apparatus. The electronic key system unlocks doorlocks of the vehicle and suchlike, dependent on authentication of the portable device by the on-board apparatus.

The Car Connectivity Consortium (CCC) defines a standard for electronic key systems for vehicles. In the standard defined by CCC, devices that are an owner device and friend devices are defined. The owner device is a device used by an owner of a vehicle, and the friend devices are devices that are expected to be used by family members or friends of the owner.

In the standard defined by CCC, communication information (software) of a digital key is employed for communications of respective key operations between the vehicle and the devices. The communication information is managed in accordance with versions of a protocol (DK_Protocol_Version). Therefore, when a version of the communication information is updated, the version may be updated at both the vehicle and the devices. However, when the vehicle and a device do not both have the same version, distance measurements, for example, may not be possible. However, simply retaining the software of older versions of the protocol is wasteful of memory and the like.

SUMMARY

An aspect of the present disclosure is a management device that includes: a memory; and a processor coupled to the memory, wherein: the memory is configured to store communication information corresponding to versions of a protocol of a digital key that implements a key operation of a vehicle from a terminal registered at the vehicle; and the processor is configured to, in response to receiving a communication request in accordance with a predetermined version of the communication information from the terminal, delete communication information corresponding to a version preceding the predetermined version from the memory.

DETAILED DESCRIPTION

Below, an example of an embodiment of the present invention is described with reference to the drawings. In the drawings, structural elements and portions that are the same or equivalent are assigned the same reference symbols. Dimensional proportions in the drawings may be exaggerated for convenience of description and may be different from actual proportions.

Figure 1:
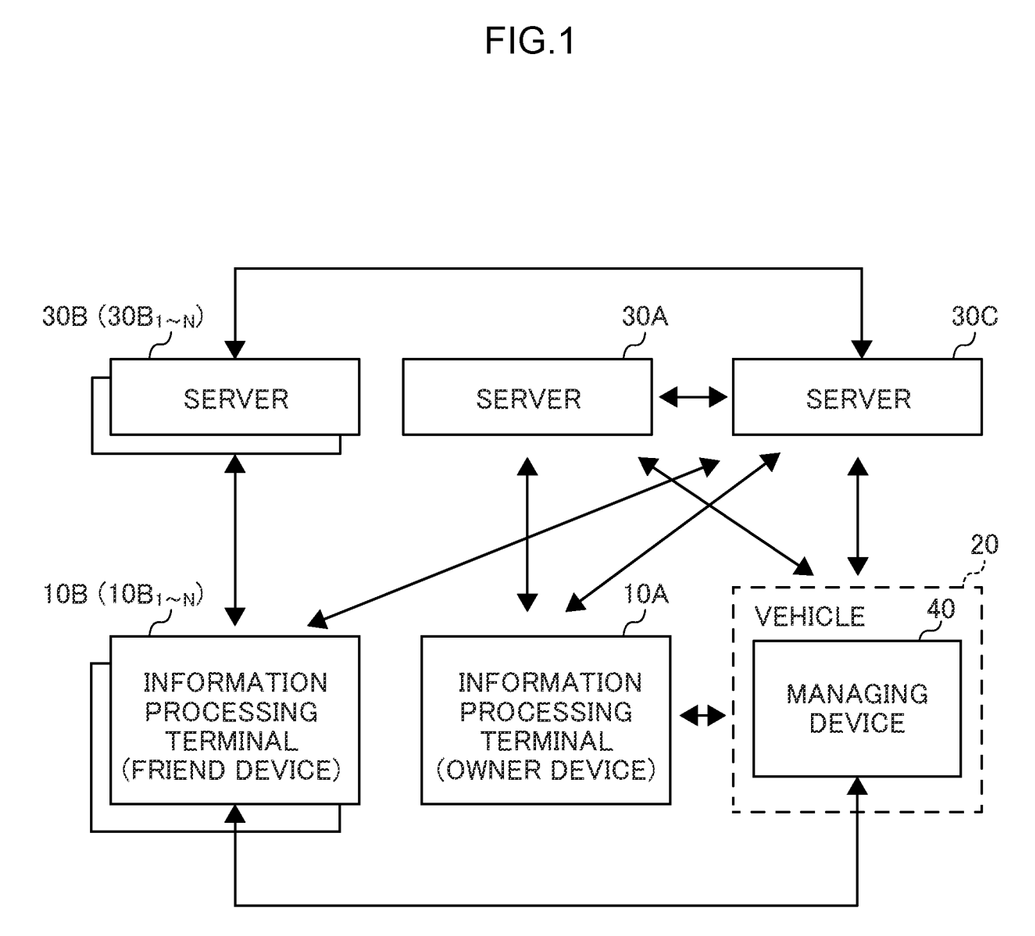
FIG. 1 is a diagram showing an example of schematic structures of a digital key system of a vehicle according to a present exemplary embodiment.

FIG. 1 is a diagram showing schematic structures of a digital key system of a vehicle according to the present exemplary embodiment. The digital key system shown in FIG. 1 includes an information processing terminal 10A, one or more of an information processing terminal 10B, a vehicle 20, and servers 30A, 30B and 30C. A management device 40 is on board the vehicle 20. Below, the information processing terminals 10A and 10B may be recited simply as "the device(s)".

The information processing terminal 10A is a terminal storing a key (a digital key) for unlocking a lock of the vehicle 20 and enabling running of the vehicle 20. The information processing terminal 10A is, for example, an owner device according to the DIGITAL KEY standard defined by CCC (below recited simply as "the owner device"). The information processing terminal 10A may be a portable terminal such as, for example, a smartphone, a wearable device or the like. The information processing terminal 10A communicates with the vehicle 20 using a short-range wireless communications technology such as Bluetooth (registered trademark) Low Energy (BLE), Near Field Communication (NFC), Ultra Wide Band (UWB) or the like.

Similarly to the information processing terminal 10A, each information processing terminal 10B is a terminal storing a key (a digital key) for unlocking the lock of the vehicle 20 and enabling running of the vehicle 20. The information processing terminal 10B is, for example, a friend device according to the DIGITAL KEY standard defined by CCC (below recited simply as "the friend device"). The information processing terminal 10B may be a portable terminal such as, for example, a smartphone, a wearable device or the like. The information processing terminal 10B communicates with the vehicle 20 using a short-range wireless communications technology such as BLE, NFC, UWB or the like. In the present exemplary embodiment, the information processing terminal 10B is described assuming that there are a plural number thereof, information processing terminals $10B_{1-N}$ (N is an integer that is at least 2).

The information processing terminals 10A and 10B may be used as digital keys by, for example, downloading and installing an application for functioning as a digital key of the vehicle 20, and having shared information relating to the digital key with the vehicle 20. With the digital key, key operations may be conducted from each device. The information relating to the digital key includes communication information (software). The information processing terminal 10A is capable of key operations of the vehicle 20 with the digital key communication information (software). The digital key communication information (software) is managed in accordance with versions of the digital key (DK_Protocol_Version). When a version of the communication information is updated, the version may be updated between the vehicle 20 and the devices (the information processing terminals 10A and 10B).

The vehicle 20 implements short-range wireless communications with each information processing terminal 10A or 10B functioning as the digital key of the vehicle 20 in accordance with the various short-range wireless communication technologies mentioned above, and the vehicle 20 carries out processing relating to the digital key. As processing relating to the digital key, the vehicle 20 executes locking processing and unlocking processing of doors of the vehicle 20. The vehicle 20 also executes processing that starts an engine or motor in accordance with a start request for the engine or motor from the information processing terminal 10A or 10B functioning as the digital key of the vehicle 20. The information processing terminals 10A and 10B that function as the digital key are registered at the vehicle 20.

When the vehicle 20 receives an engine start request from the information processing terminal 10A or 10B, the vehicle 20 makes a determination as to whether the information processing terminal 10A or 10B is located in a vehicle cabin of the vehicle 20. This determination as to whether the information processing terminal 10A or 10B is located in the vehicle cabin of the vehicle 20 is in order to prevent the engine starting in a state in which the information processing terminal 10A or 10B is outside the vehicle cabin. The vehicle 20 makes the determination as to whether the information processing terminal 10A or 10B is located in the vehicle cabin of the vehicle 20 by referring to a strength of electromagnetic waves emitted from the information processing terminal 10A or 10B and received by an antenna provided in the vehicle cabin.

When one of the information processing terminal 10B is added as a friend device of the vehicle 20, the information processing terminal 10B communicates with an antenna provided at a predetermined location in the vehicle cabin of the vehicle 20 and shares information relating to the digital key with the vehicle 20.

The server 30A provides the information processing terminal 10A with information enabling the information processing terminal 10A to function as a digital key of the vehicle 20. In response to a request from the information processing terminal 10A, as the information enabling functioning as the digital key of the vehicle 20, the server 30A provides the information processing terminal 10A with a digital key application, information relating to the digital key, and the like.

Each server 30B provides the corresponding information processing terminal 10B with information enabling the information processing terminal 10B to function as a digital key of the vehicle 20. In response to a request from the information processing terminal 10B, as the information enabling functioning as the digital key of the vehicle 20, the server 30B provides the information processing terminal 10B with a digital key application, information relating to the digital key, and the like. The servers 30B include servers $30B_{1-N}$ configured in a number corresponding to the number N of the information processing terminals $10B_{1-N}$ that are the friend devices.

The servers 30A and 30B may be respectively provided at, for example, the manufacturer of each information processing terminal 10A or 10B. The information enabling functioning as the digital key may be provided from the same server provided the manufacturer of the information processing terminal 10A is the same.

In coordination with the servers 30A and 30B, the server 30C provides information enabling the information processing terminals 10A and 10B to function as the digital keys of the vehicle 20 to the information processing terminals 10A and 10B and the vehicle 20. The server 30C may be provided at the respective manufacturer of the vehicle 20. In response to a request from the information processing terminal 10A or the vehicle 20, or even without a request from the information processing terminals 10A and 10B or vehicle 20, the server 30C provides information relating to the digital keys and the like to the vehicle 20 as the information enabling functioning as the digital keys of the vehicle 20.

When a version of the communication information is updated, the server 30C transmits the new version of the communication information to each of the information processing terminals 10A and 10B and the vehicle 20 with which communication is possible. However, each information processing terminal 10A or 10B may not be updated with the new version of the communication information because communication is not possible.

Here, the update of the version of the communication information is carried out by communication with the corresponding server. The information processing terminal 10A updates the communication information by communication with the server 30A, the information processing terminals 10B update the communication information by communication with the servers 30B, and the vehicle 20 updates the communication information by communication with the server 30C.

The management device 40 is a device for managing deletion of versions of the communication information at the vehicle 20. Functional structures of the management device 40 are described below.

Figure 2:
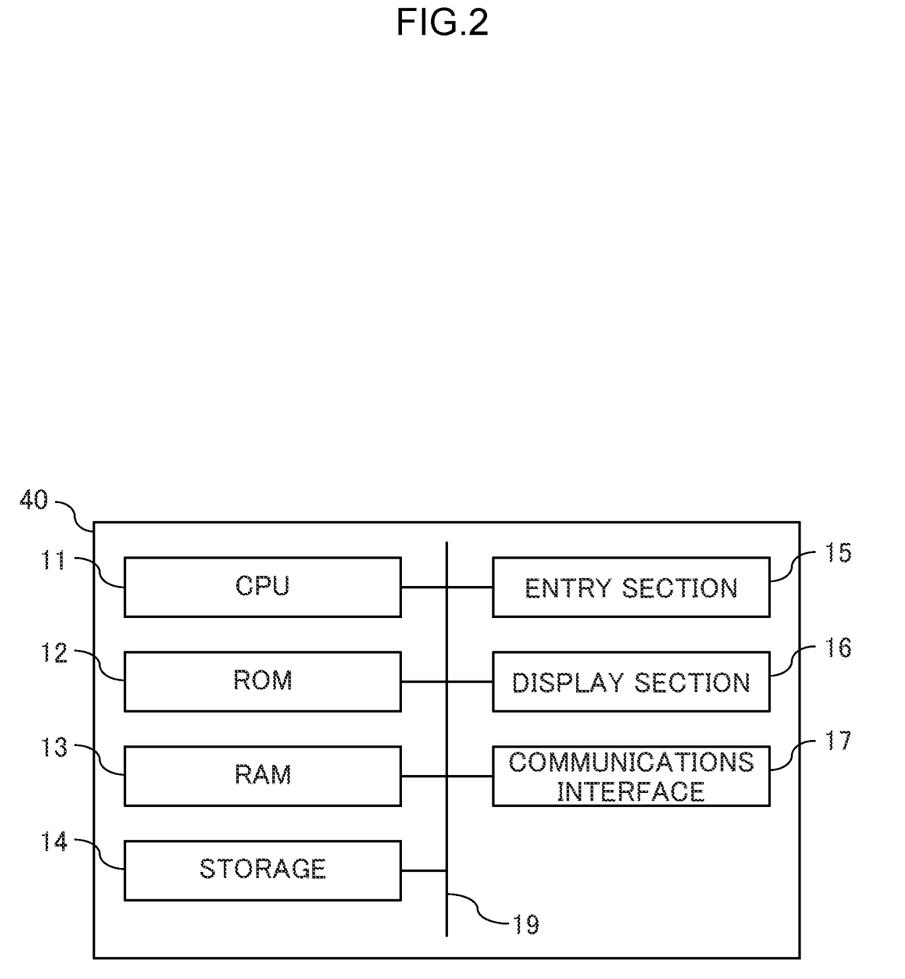
FIG. 2 is a block diagram showing an example of hardware structures of a management device.

Now, hardware structures of the management device 40 are described. FIG. 2 is a block diagram showing the hardware structures of the management device 40.

As shown in FIG. 2, the management device 40 includes a central processing unit (CPU) 11, read-only memory (ROM) 12, random access memory (RAM) 13, storage 14, an entry section 15, a display section 16, and a communications interface 17. These structures are connected to be capable of communicating with one another via a bus 19.

The CPU 11 executes various programs and controls respective parts. That is, the CPU 11, which is an example of a hardware processor, loads a program from the ROM 12 or storage 14, which is equivalent to memory, and executes the program, using the RAM 13 as a workspace. The CPU 11 implements control of the structures described above and various kinds of computational processing in accordance with programs recorded in the ROM 12 or storage 14. In the present exemplary embodiment, the ROM 12 or storage 14 stores a computer program that implements management processing.

The ROM 12 stores various programs and various kinds of data. The RAM 13, which is equivalent to memory, serves as a workspace, temporarily memorizing programs and data. The storage 14 is structured by a memory apparatus such as a hard disk drive (HDD), a solid state drive (SSD), a flash memory or the like. The storage 14 stores various programs, including an operating system, and various kinds of data.

The entry section 15 includes a keyboard and buttons in a touch panel system or the like and is used for various kinds of entry.

The display section 16 is, for example, a liquid crystal display and displays various kinds of information. The display section 16 may be employed in combination with the touch panel system and function as the entry section.

The communications interface 17 is an interface for communicating with other devices, such as the information processing terminal 10A, the server 30A, the server 30C and so forth. The communications interface 17 employs a standard such as, for example, Ethernet (registered trademark), FDDI, Wi-Fi (registered trademark), BLE, NFC, UWB or the like.

The information processing terminals 10A and 10B may have similar hardware structures to the management device 40. The information processing terminals 10A and 10B store programs relating to the digital keys of the vehicle 20.

When a computer program mentioned above is executed, the management device 40 uses the hardware resources described above to realize various functions. Functional structures realized by the management device 40 are now described.

Figure 3:
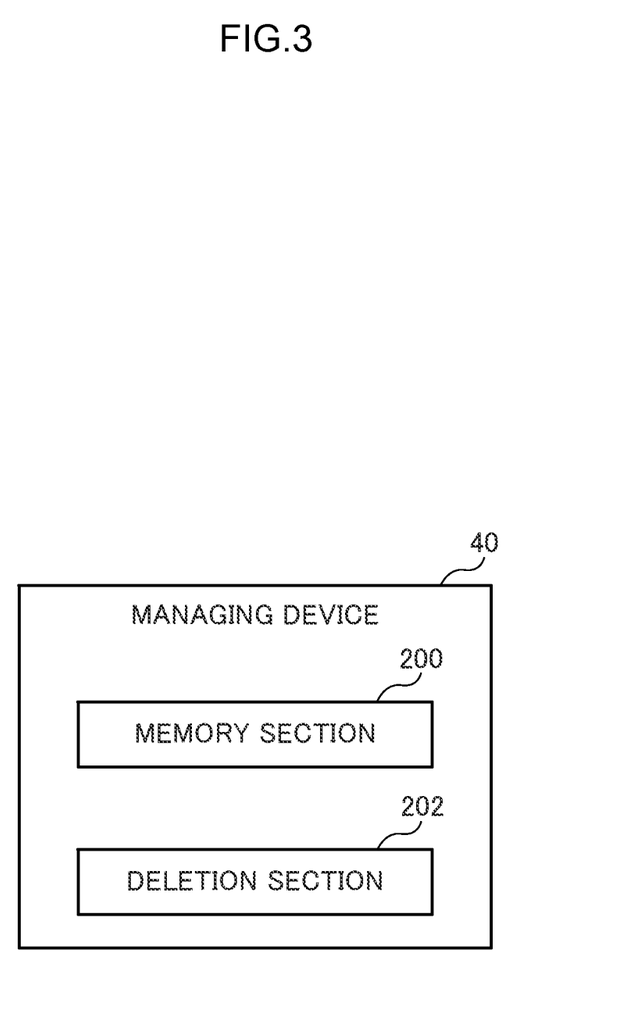
FIG. 3 is a block diagram showing an example of functional structures of the management device.

FIG. 3 is a block diagram showing the functional structures of the management device 40. As shown in FIG. 3, the management device 40 includes, as the functional structures, a memory section 200 and a deletion section 202. These functional structures are realized by the CPU 11 loading and executing the computer program memorized at the ROM 12 or storage 14. As hardware, the memory section 200 is equivalent to, for example, the ROM 12 or the storage 14.

Figure 4:
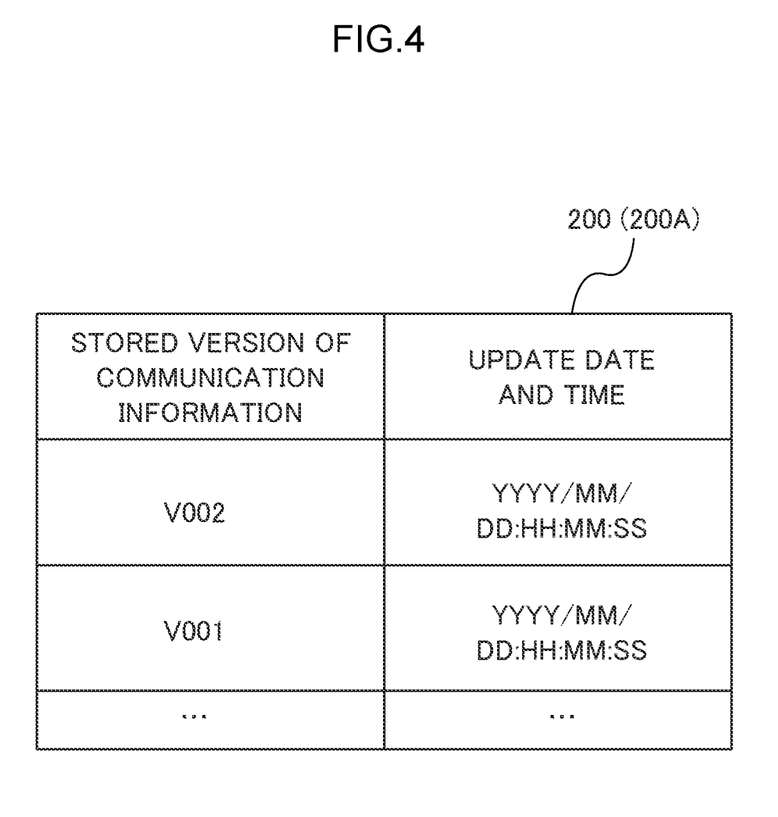
FIG. 4 is an example of updated versions of communication information at the vehicle.

The memory section 200 memorizes the communication information. The memory section 200 also memorizes which versions of the communication information have been used in the most recent communication requests by devices registered to use the digital keys at the vehicle 20 (the information processing terminals 10A and 10B) and equivalent devices. The management device 40 checks the version of the communication information of a device each time the device communicates with the vehicle 20 and, when there has been an update, the management device 40 updates the version of the communication information at the device. The communication information is software corresponding to a version of the digital key protocol, and is memorized for each version. FIG. 4 shows an example of versions of the communication information that have been updated at the vehicle 20, which is memorized at the memory section 200. A version list 200A in FIG. 4 is a list recording versions of the communication information at the vehicle 20. In the example in FIG. 4, versions of the communication information "V001" and "V002" are memorized at the memory section 200 in the field "Memorized version of communication information". An update date and time of each version (YYYY/MM/DD:HH:MM:SS) is also memorized. The ROM 12, which is memory, is used for memorizing the communication information.

Figure 5A:
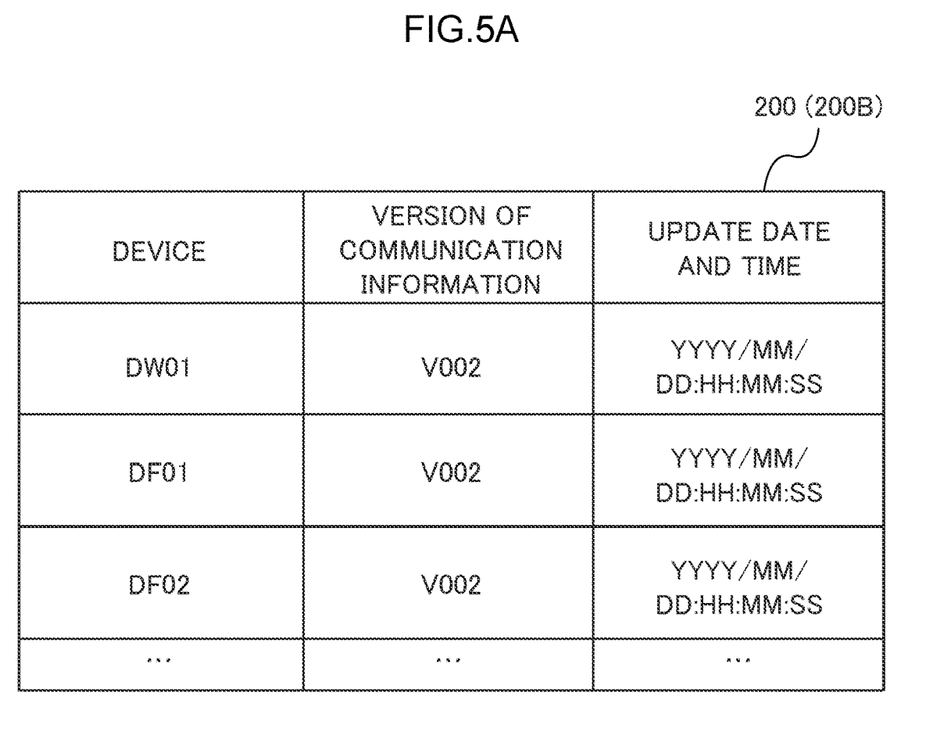
FIG. 5A is an example of devices and versions used for communication requests from the devices that is memorized at a memory section.

FIG. 5A shows an example that is memorized at the memory section 200 of versions of the communication information that have been used in communication requests by the devices and equivalent devices. A device list 200B in FIG. 5A is a list recording the devices that are registered at the vehicle 20. In the example in FIG. 5A, a device DW01 is registered as the information processing terminal 10A and devices DF01 and DF02 are registered as the information processing terminals 10B ($10B_1$ and $10B_2$). In the example in FIG. 5A, the most recent version (V002) is memorized for all the devices: the version at DW01 is V002, the version at DF01 is V002, and the version at DF02 is V002. A version update date and time (YYYY/MM/DD:HH:MM:SS) is also memorized for each device.

Figure 5B:
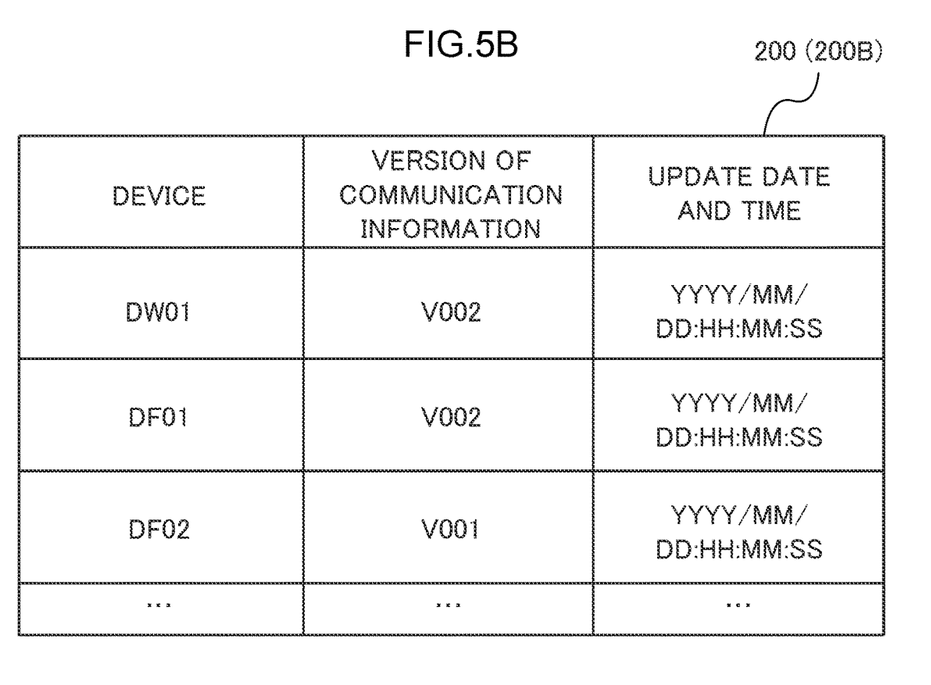
FIG. 5B is another example of devices and versions used for communication requests from the devices that is memorized at the memory section.

FIG. 5B shows another example that is memorized at the memory section 200 of the versions of the communication information that have been used in communication requests by the devices and equivalent devices. Similarly to FIG. 5A, the devices DW01, DF01 and DF02 are registered as devices. In the example in FIG. 5B, the version at DF02 has not been updated. That is, the version at DW01 is V002, the version at DF01 is V002, and the version at DF02 is V001.

When communication requests in accordance with a predetermined version of the communication information have been received from all the devices, the deletion section 202 deletes the communication information corresponding to a version preceding the predetermined version. The predetermined version referred to here is the most recent version to which the vehicle 20 has been updated. In the example in FIG. 4 described above, the most recent version to which the vehicle 20 has been updated is V002. To determine which version received communication requests have been in, it is sufficient to refer to the version memorized for each device at the memory section 200. In the case of the example in FIG. 5A described above, because communication requests in accordance with the predetermined version have been received from all the devices, the deletion section 202 deletes the communication information of the version (V001) preceding the most recent version (V002). In the case of the example in FIG. 5B described above, communication requests in accordance with the predetermined version have not been received from all the devices. Therefore, the deletion section 202 does not delete the preceding version.

The communication information corresponding to the preceding version may be specified as appropriate as the communication information of all preceding versions or, when versions are managed as major versions and minor versions, the communication information of a preceding major version, or the like. When the communication information of all preceding versions is to be deleted, if the most recent version is "V007", then all versions up to a preceding version "V006" are deleted. A situation in which communication information of a preceding major version is to be deleted is described: for example, the most recent version is "V006.3", memorized minor versions are "V006.2" and "V006.1", and a memorized preceding major version is "V005.5". In this situation, versions up to V005.5, which precedes the V006 family, are deleted. V006.2 and V006.1, which are the same major version as the most recent version but different minor versions are retained. Thus, only minor versions are retained and memory may be utilized effectively while a state in which a minor version rollback is simple is maintained.

The predetermined version being the most recent version to which the vehicle 20 has been updated is an example. The predetermined version may also be a version one or two versions prior to the most recent version or the like. As an example, the most recent version is V005. In a situation in which the predetermined version is the version one prior to the most recent version, the predetermined version is V004. In this case, the deletion section 202 deletes the communication information of versions V003 to V001 preceding version V004. Thus, the communication information of a certain number of versions, one or the like, prior to the most recent version is retained, and versions preceding the certain number of prior versions are deleted. Therefore, memory may be utilized effectively while a rollback is simple, because the certain number of preceding versions may be used. Therefore, even if some kind of defect is found in the communication information, this situation may be managed.

In the present exemplary embodiment, a situation in which communication requests in accordance with the predetermined version have been received from all the devices is given as an example, but this is not limiting. The predetermined version may be set as appropriate in accordance with operation of the digital key system, such as when a communication request has been received only from the owner device, when communication requests have been received from the owner device and at least a certain number of friend devices, or the like.

Further, the deletion section 202 may delete the communication information corresponding to the version preceding the predetermined version when a communication request in accordance with the predetermined version has been received from a device and a predetermined duration has passed. The predetermined duration is expected to be, for example, one month, three months or the like. When the communication information has been updated to the most recent version and a certain duration has passed, the communication information of the most recent version can be assumed to be operating stably, and deleting the preceding version may not cause any problem. Thus, the timing of deletion of a preceding version may be specified in accordance with a period instead of immediate deletion.

The management device 40 may report an update to a predetermined version to a communication address associated with, among the plural registered devices, each device that has not transmitted a communication request in accordance with the predetermined version. This is because communications of each of the information processing terminals 10A and 10B with the corresponding server and updating of the communication information is arbitrary for each device. For example, in the example in FIG. 5B, the update of the version of the communication information is reported to the information processing terminal 10B₂ that is the device DF02 that has not been updated to the new version. The communication address is expected to be the information processing terminal 10A or 10B itself or an email address, social media address or the like registered for the information processing terminal 10A or 10B.

—Flow of Control—

Figure 6:
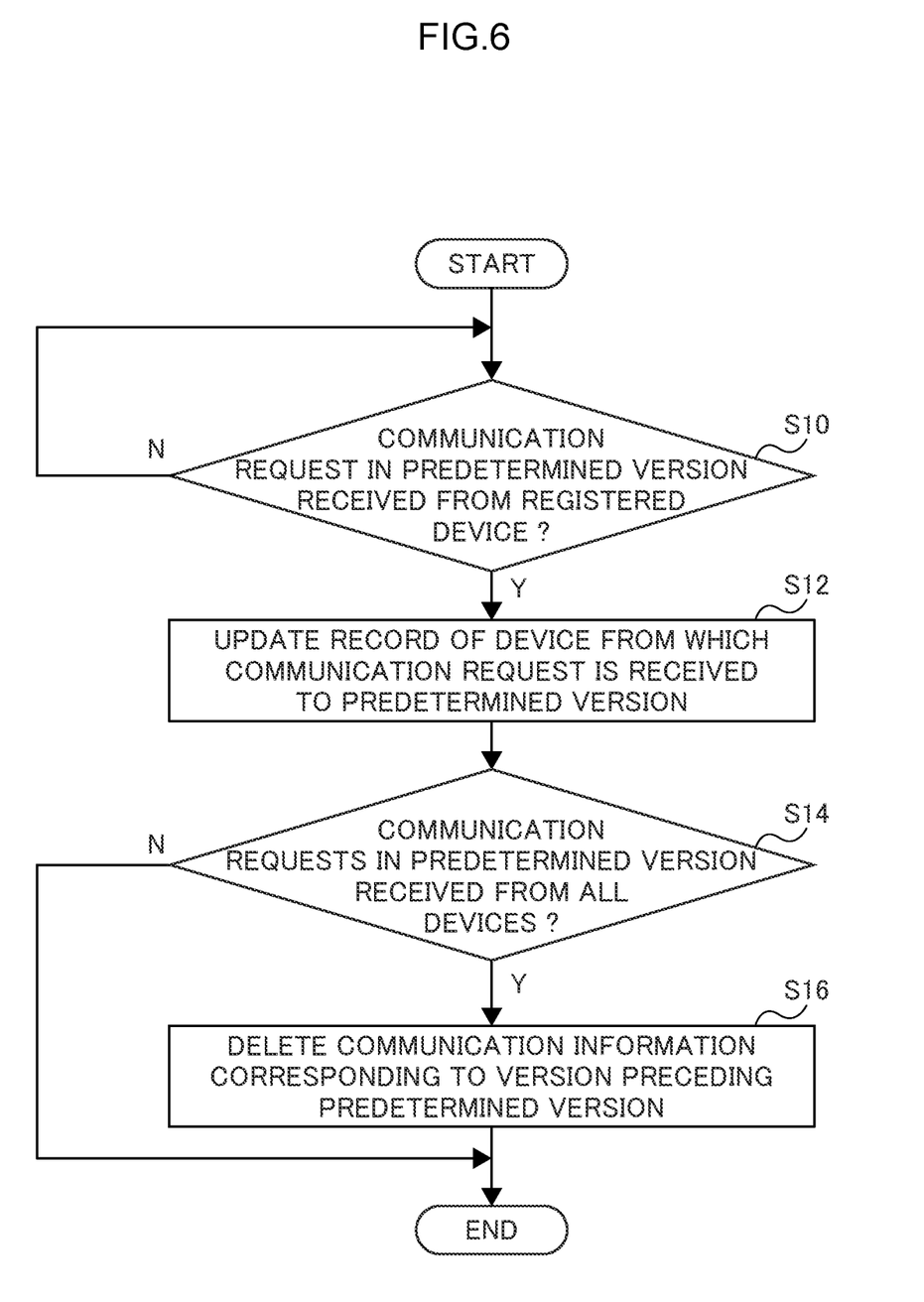
FIG. 6 is an example of a flowchart showing a flow of management processing at the management device.

Flow of the management processing according to the present exemplary embodiment is described using the flowchart of FIG. 6. Periodically or at each occurrence of a predetermined trigger, for example, each time a communication request is made, the CPU 11 of the management device 40 executes the processes described below. Although a situation in which the CPU 11 executes the processes is recited, this is not limiting. The flowchart below may be implemented by one or more processors loading and executing programs memorized at one or more memories.

In step S10, the CPU 11 makes a determination as to whether a communication request in accordance with a predetermined version has been received from a device registered at the vehicle 20. When this request is received, the CPU 11 proceeds to step S12, and when no request is received, the CPU 11 returns to step S10.

In step S12, the CPU 11 updates the record for the device from which the communication request is received to the predetermined version. Thus, the version of the communication information at that device that is memorized in the device list 200B at the memory section 200 is updated.

In step S14, the CPU 11 makes a determination as to whether communication requests in accordance with the predetermined version have been received from all the devices. If these requests have been received from all the devices, the CPU 11 proceeds to step S16, and if these requests have not been received from all the devices, the processing ends. The subject devices of this step are specified as appropriate in accordance with operations of the digital key system: alternatively to all devices as described above, the determination may be as to whether communication requests have come from the owner device and at least a certain number of friend devices, or the like.

In step S16, the CPU 11 deletes the communication information corresponding to a version preceding the predetermined version. Accordingly, the preceding version recorded in the version list 200A is deleted.

According to the management device 40 according to the present exemplary embodiment, limited amounts of memory in the vehicle 20 may be utilized effectively.

Alternatively, the deletion section 202 may delete the communication information corresponding to the version preceding the predetermined version when a communication request in accordance with the predetermined version has been received and a predetermined duration has passed. Thus, a version of the communication information may be deleted when a certain duration has passed after an update, and memory may be utilized effectively.

The update to the predetermined version may be reported to a communication address associated with, among the plural devices registered as subjects of key operations of the vehicle 20 (the information processing terminals 10A and 10B), each device that has not transmitted a communication request in accordance with the predetermined version. Thus, a user carrying the device may be prompted to update to the new version of the communication information.

The information processing that, in the exemplary embodiment described above, is executed by a CPU loading software (a program) may be executed by various kinds of processor other than the CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The information processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiment described above, a mode is described in which the information processing program is memorized in advance (installed) at the ROM or storage, but this is not limiting. The program may be provided in a mode recorded on a non-transitory recording medium, such as a CD-ROM (Compact Disc Read-Only Memory), DVD-ROM (Digital Versatile Disc Read-Only Memory), USB (Universal Serial Bus) memory or the like. Modes are also possible in which a program is downloaded from external equipment via a network.

According to the present disclosure, limited amounts of memory in a vehicle may be utilized effectively.

A first aspect of the present disclosure is a management device that includes: a memory; and a processor coupled to the memory, wherein: the memory is configured to store communication information corresponding to versions of a protocol of a digital key that implements a key operation of a vehicle from a terminal registered at the vehicle; and the processor is configured to, in response to receiving a communication request in accordance with a predetermined version of the communication information from the terminal, delete communication information corresponding to a version preceding the predetermined version from the memory.

According to the first aspect, when communication requests in accordance with a new version have arrived from the registered device(s), an older version of the communication information at the vehicle is deleted.

A second aspect of the present disclosure is the management device according to the first aspect, wherein the processor is configured to delete the communication information corresponding to the version preceding the predetermined version, in response to a predetermined period of time passing after the communication request in accordance with the predetermined version has been received.

A third aspect of the present disclosure is the management device according to the first aspect, wherein: at least two terminals are registered as being subject to the key operation of the vehicle; and the processor is configured to report an update to the predetermined version to a communication address associated with a terminal, among the at least two terminals, that has not transmitted a communication request in accordance with the predetermined version.

A fourth aspect of the present disclosure is a management method that includes: by a processor, receiving a communication request from a terminal registered at a vehicle in accordance with communication information stored at a memory, the communication information corresponding to versions of a protocol of a digital key that implements a key operation of the vehicle; and in a case in which the received communication request is in accordance with a predetermined version of the communication information, deleting communication information corresponding to a version preceding the predetermined version from the memory.

A fifth aspect of the present disclosure is a non-transitory computer readable recording medium recording a management program that is executable by a processor to execute processing, the processing comprising: receiving a communication request from a terminal registered at a vehicle in accordance with communication information stored at a memory, the communication information corresponding to versions of a protocol of a digital key that implements a key operation of the vehicle; and in a case in which the received communication request is in accordance with a predetermined version of the communication information, deleting communication information corresponding to a version preceding the predetermined version from the memory.

According to the present disclosure, limited amounts of memory in a vehicle may be utilized effectively.

What is claimed is:

1. A management device comprising:
a memory; and
a processor coupled to the memory, wherein:
the memory is configured to store communication information corresponding to versions of a protocol of a digital key that implements a key operation of a vehicle from a terminal registered at the vehicle; and
the processor is configured to, in response to receiving a communication request in accordance with a predetermined version of the communication information from the terminal, delete communication information corresponding to a version preceding the predetermined version from the memory,
wherein
at least two terminals are registered as being subject to the key operation of the vehicle; and
the processor is configured to report an update to the predetermined version to a communication address associated with a terminal, among the at least two terminals, that has not transmitted a communication request in accordance with the predetermined version.

2. The management device according to claim 1, wherein the processor is configured to delete the communication information corresponding to the version preceding the predetermined version, in response to a predetermined period of time passing after the communication request in accordance with the predetermined version has been received.

3. A management method comprising:
by a processor,
receiving a communication request from a terminal registered at a vehicle in accordance with communication information stored at a memory, the communication information corresponding to versions of a protocol of a digital key that implements a key operation of the vehicle; and
in a case in which the received communication request is in accordance with a predetermined version of the communication information, deleting communication information corresponding to a version preceding the predetermined version from the memory,
wherein
at least two terminals are registered as being subject to the key operation of the vehicle; and
the processor is configured to report an update to the predetermined version to a communication address associated with a terminal, among the at least two terminals, that has not transmitted a communication request in accordance with the predetermined version.

4. A non-transitory computer readable recording medium recording a management program that is executable by a processor to execute processing, the processing comprising:
receiving a communication request from a terminal registered at a vehicle in accordance with communication information stored at a memory, the communication information corresponding to versions of a protocol of a digital key that implements a key operation of the vehicle; and
in a case in which the received communication request is in accordance with a predetermined version of the communication information, deleting communication information corresponding to a version preceding the predetermined version from the memory,
wherein at least two terminals are registered as being subject to the key operation of the vehicle; and the processor is configured to report an update to the predetermined version to a communication address associated with a terminal, among the at least two terminals, that has not transmitted a communication request in accordance with the predetermined version.

\* \* \* \* \*